United States Patent
Ishido

(10) Patent No.: US 11,659,117 B2
(45) Date of Patent: May 23, 2023

(54) IMAGE FORMING APPARATUS COMPRISING A SHEET READING UNIT INCLUDING A LINE SENSOR THAT INCLUDES A PLURALITY OF SPLIT LINE SENSORS ARRAYED IN A ROW AND PLACED AT NON-STRETCHING POSITIONS, WHEREIN EACH NON-STRETCHING POSITIONS IS A POSITION THAT DISTANCE IN THE MAIN SCANNING DIRECTION FROM A GAP TO AN IDEAL EDGE POSITION OF EVERY USABLE REGULAR SIZE EXCEEDS A PERMISSABLE VALUE

(71) Applicant: KYOCERA Document Solutions Inc., Osaka (JP)

(72) Inventor: Kohei Ishido, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/703,885

(22) Filed: Mar. 24, 2022

(65) Prior Publication Data
US 2022/0311895 A1    Sep. 29, 2022

(30) Foreign Application Priority Data
Mar. 26, 2021   (JP) .............................. JP2021-053964

(51) Int. Cl.
*H04N 1/00*    (2006.01)
*H04N 1/03*    (2006.01)
*B65H 7/14*    (2006.01)

(52) U.S. Cl.
CPC ...... *H04N 1/00809* (2013.01); *H04N 1/00702* (2013.01); *H04N 1/00816* (2013.01); *H04N 1/0306* (2013.01); *B65H 2553/416* (2013.01)

(58) Field of Classification Search
CPC .......... H04N 1/00702; H04N 1/00809; H04N 1/00816; H04N 1/0306; H04N 1/00718; H04N 1/3878; H04N 1/00681; B65H 2553/416
USPC ............................. 358/453, 449, 501, 1.13
See application file for complete search history.

(56) References Cited

U.S. PATENT DOCUMENTS

| | | | |
|---|---|---|---|
| 2018/0249035 A1* | 8/2018 | Fujiuchi | H04N 1/00795 |
| 2020/0099812 A1* | 3/2020 | Ishii | B65H 7/14 |
| 2021/0171304 A1* | 6/2021 | Ishido | B65H 7/06 |

(Continued)

FOREIGN PATENT DOCUMENTS

| | | | |
|---|---|---|---|
| JP | 2005-77975 A |  | 3/2005 |
| JP | 2005077975 A | * | 3/2005 |

*Primary Examiner* — Chad Dickerson
(74) *Attorney, Agent, or Firm* — Stein IP, LLC

(57) ABSTRACT

The image forming apparatus includes a sheet conveyance part, an image forming part, and a sheet reading unit. The sheet reading unit includes a line sensor. The line sensor includes split line sensors. The line sensor reads a conveyed sheet. The line sensor includes a plurality of split line sensors. The split line sensors are placed at non-stretching positions, respectively. Each non-stretching position is such a position that as in the main scanning direction, a main-scanning-direction distance from a gap between one split line sensor and another split line sensor to an ideal edge position of every usable regular size exceeds a permissible value.

8 Claims, 9 Drawing Sheets

(56) References Cited

U.S. PATENT DOCUMENTS

2021/0173334 A1* 6/2021 Ishido ................ H04N 1/00915
2021/0321013 A1* 10/2021 Ishido ................ H04N 1/00034

* cited by examiner

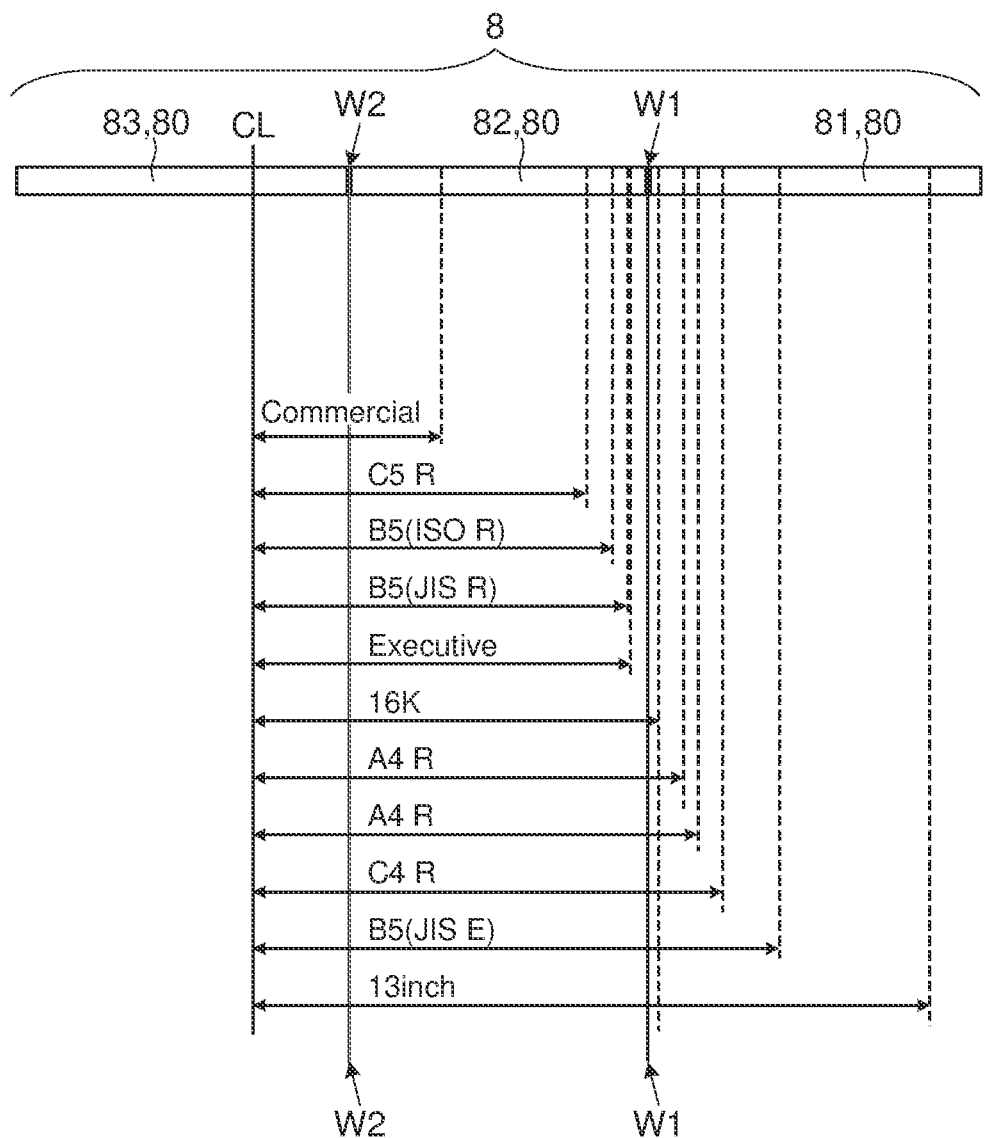

IMAGE FORMING APPARATUS COMPRISING A SHEET READING UNIT INCLUDING A LINE SENSOR THAT INCLUDES A PLURALITY OF SPLIT LINE SENSORS ARRAYED IN A ROW AND PLACED AT NON-STRETCHING POSITIONS, WHEREIN EACH NON-STRETCHING POSITIONS IS A POSITION THAT DISTANCE IN THE MAIN SCANNING DIRECTION FROM A GAP TO AN IDEAL EDGE POSITION OF EVERY USABLE REGULAR SIZE EXCEEDS A PERMISSABLE VALUE

INCORPORATION BY REFERENCE

This application is based upon and claims the benefit of priority from the corresponding Japanese Patent Application No. 2021-53964 filed on Mar. 26, 2021, the entire contents of which are incorporated herein by reference.

BACKGROUND

The present disclosure relates to an image forming apparatus that conveys a paper sheet to be printed thereon and that reads the conveyed sheet.

A reading unit for reading a conveyed sheet may be provided in image forming apparatuses. The reading unit includes an image sensor.

Also, an image sensor may be provided in image forming apparatuses. For example, a line sensor as an image sensor may be placed on a sheet conveyance path. The line sensor reads a conveyed sheet. A status of a sheet under conveyance can be known based on image data obtained by reading the conveyed sheet.

SUMMARY

An image forming apparatus according to the present disclose includes a sheet conveyance part, an image forming part, and a sheet reading unit. The sheet conveyance part conveys a sheet. The image forming part forms an image on a conveyed sheet. The sheet reading unit includes a lamp and a line sensor. The lamp throws light to the conveyed sheet. The line sensor reads the conveyed sheet. The sheet reading unit is provided sheet-conveyance upstream of the image forming part. The line sensor includes a plurality of split line sensors. The split line sensors are arrayed in a row. Light-receiving elements of each of the split line sensors are arrayed along a main scanning direction. The split line sensors are placed at non-stretching positions, respectively. Each of the non-stretching positions is such a position that a distance in the main scanning direction from a gap between one and another of the split line sensors to an ideal edge position of every usable regular size exceeds a permissible value in the main scanning direction. The ideal edge position is a position of an edge of the conveyed sheet with no displacement in the main scanning direction. The permissible value is predetermined and equal to an upper-limit value of a permissible range for displacement of the conveyed sheet in the main scanning direction.

Still further objects of the disclosure as well as concrete advantages obtained by the disclosure will become more apparent from an embodiment thereof described hereinbelow.

BRIEF DESCRIPTION OF THE DRAWINGS

FIG. 9 is a diagram showing an example of placement of split line sensors according to the embodiment.

DETAILED DESCRIPTION

Hereinbelow, an image forming apparatus according to an embodiment will be described with reference to FIGS. 1 to 9. The following description will be made by illustrating a multifunction peripheral 100 as an image forming apparatus. The multifunction peripheral 100 is capable of printing and transmission based on image data. It should be noted that the image forming apparatus is not limited to the multifunction peripheral 100 and may be, for example, a printer. Individual constitutional elements such as configuration and placement included in the description of this embodiment should be construed merely as illustrative examples without limiting the scope of the disclosure.

A prior art is described before description of the multifunction peripheral 100.

A line sensor includes a plurality of photoelectric conversion elements. Electric charges stored in the individual photoelectric conversion elements are read out sequentially. The larger the number of photoelectric conversion elements included in one line sensor is, the larger the number of charge readout times by one-time scan becomes. Accordingly, there are some cases where one line sensor is split into a plurality of blocks. In this case, charges can be read out from those blocks, respectively. It follows that one-line scans can be achieved at high speed without using high-speed readout signals (clock signals).

Various sheet sizes (regular sizes) are available for use in image forming apparatuses. Sheets may be displaced toward one side of a main scanning direction in some cases and may be displaced toward the other side in other cases. The way of displacement of paper sheets is indeterminate. A sheet end may be either over or within a block-to-block boundary. That is, outer-side blocks or inner-side blocks in the main scanning direction, as viewed from ends of a paper sheet, read out a sheet end in some cases or fail to read out a sheet end in other cases. In this case, recognizing a position of a sheet end necessarily involves checking image data of a plurality of blocks stretching over a boundary. However, the count of blocks involved in checking of image data increases more and more with increasing amount of data to be processed, causing complication of control as a problem.

In view of the above-described problem, this embodiment is so designed that with use of plurally split line sensors, data amount to be processed is reduced to simplify the processing.

(Multifunction Peripheral 100)

Figure 1:
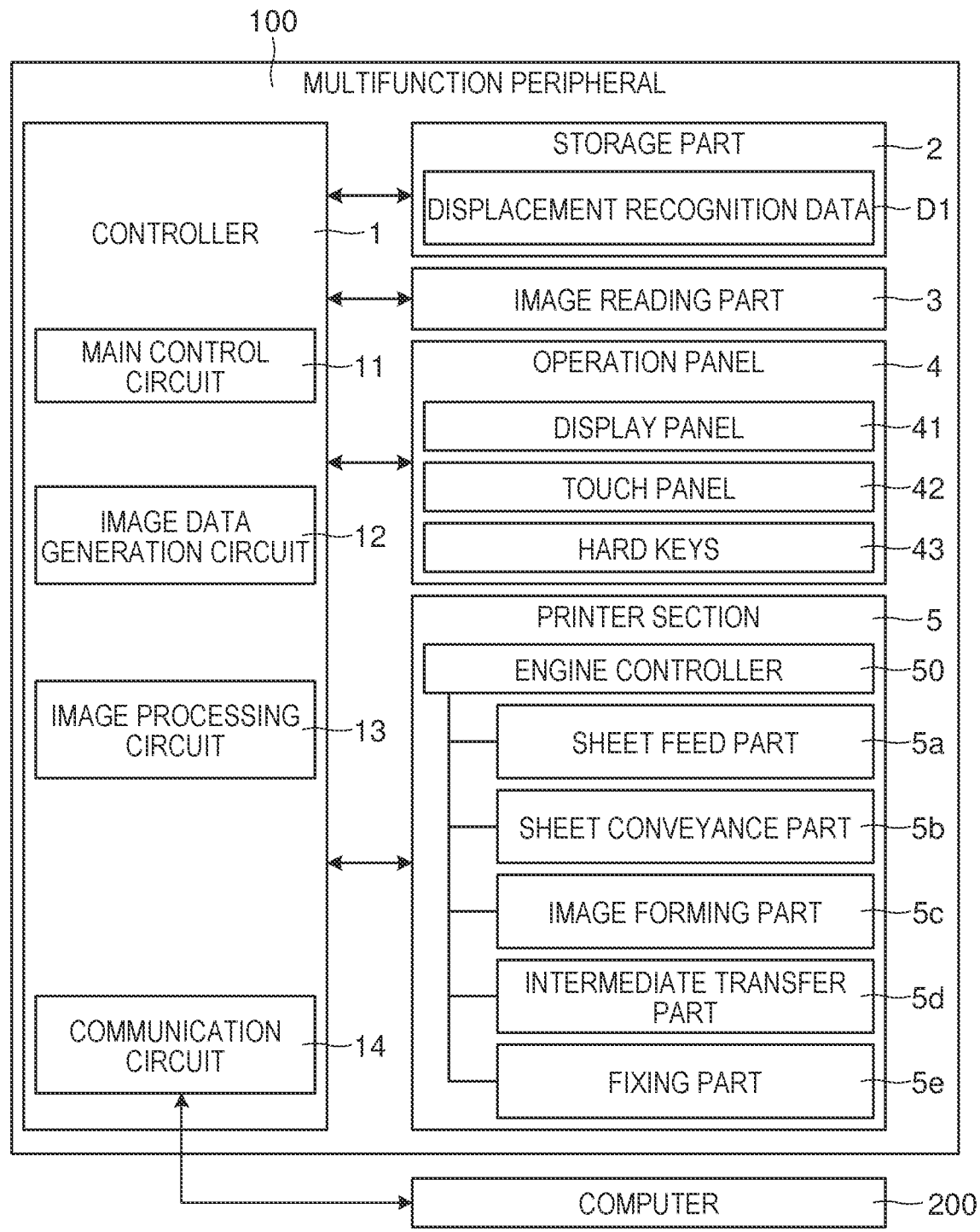
FIG. 1 is a diagram showing an example of a multifunction peripheral according to an embodiment.
Figure 2:
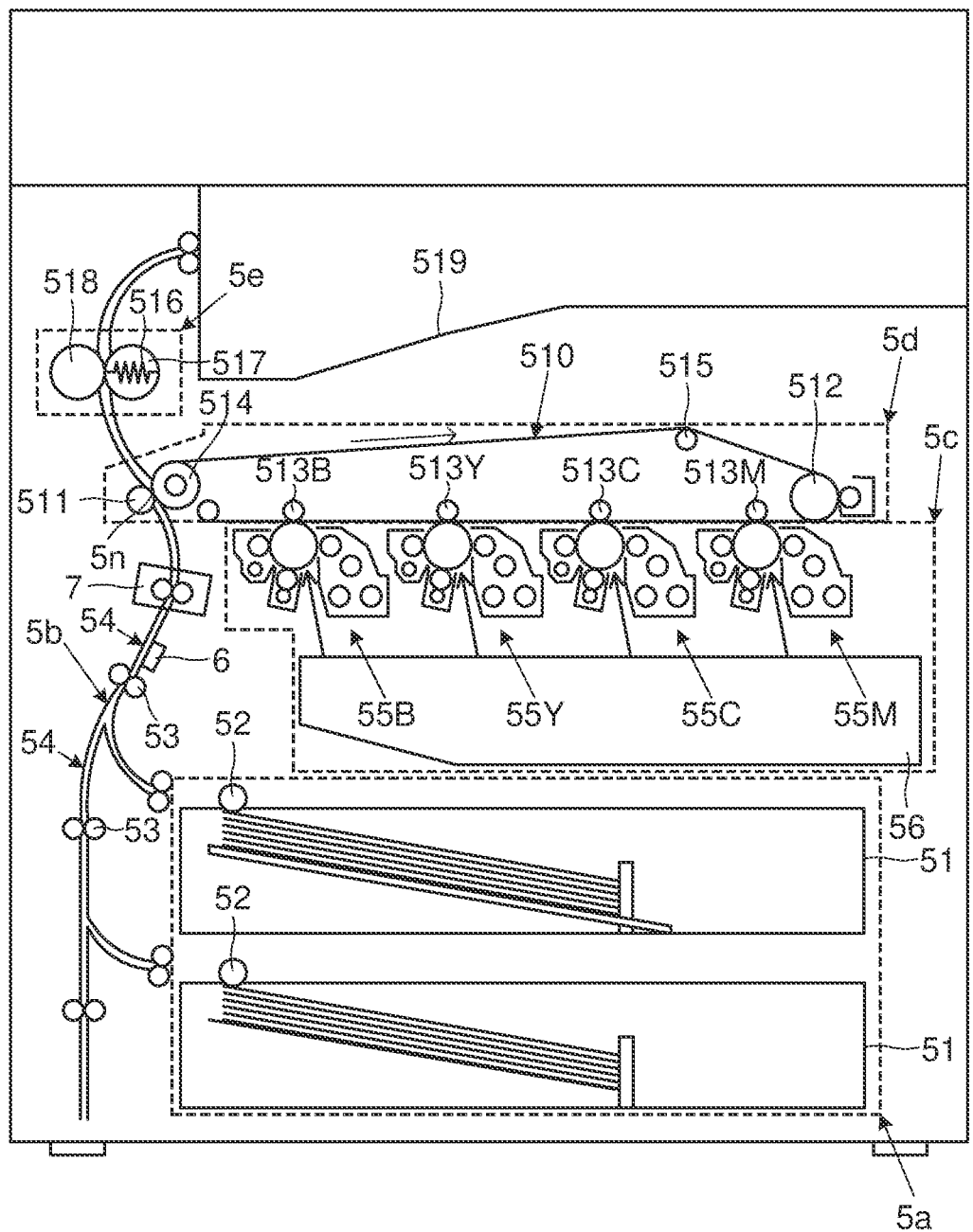
FIG. 2 is a view showing an example of the multifunction peripheral according to the embodiment.
Figure 3:
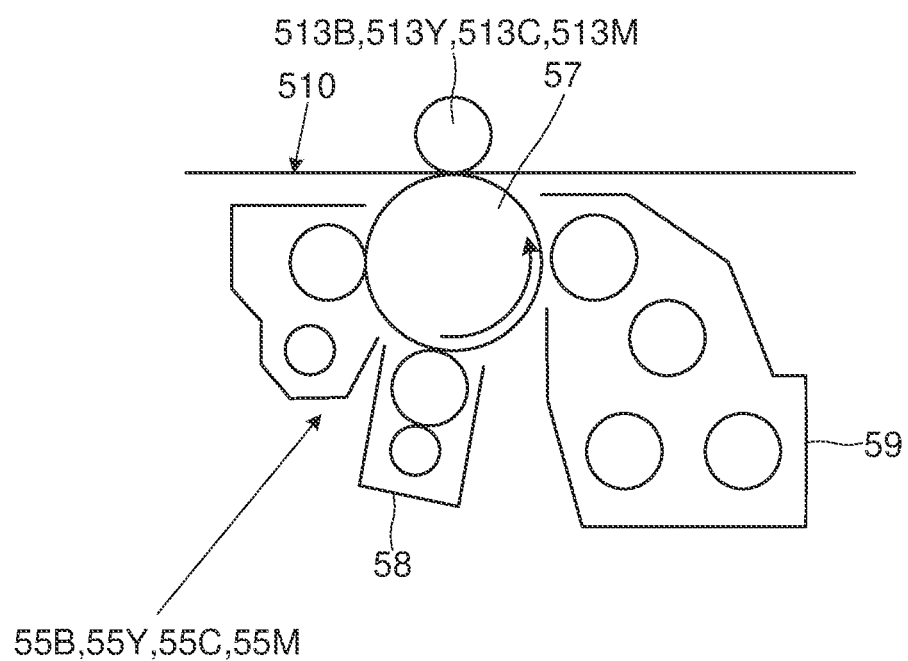
FIG. 3 is a view showing an example of an image forming part according to the embodiment.

The multifunction peripheral 100 according to the embodiment will be described below with reference to FIGS. 1 to 3. FIGS. 1 and 2 are views showing an example of the multifunction peripheral 100 according to the embodiment. FIG. 3 is a view showing an example of an image forming part 5c according to the embodiment.

As shown in FIG. 1, the multifunction peripheral 100 includes a controller 1, a storage part 2, an image reading part 3, an operation panel 4, and a printer section 5.

The controller 1 controls operations of the multifunction peripheral 100. The controller 1 controls operations of individual parts of the multifunction peripheral 100 in course of jobs (copy, transmission). The controller 1 includes a main control circuit 11, an image data generation circuit 12, an image processing circuit 13, and a communication circuit 14. The main control circuit 11 is, for example, a CPU, The main control circuit 11 performs processes and arithmetic operations relating to jobs. The image data generation circuit 12 includes an A/D conversion circuit. The image data generation circuit 12 generates image data of a document by processing analog image signals outputted by the image reading part 3 that has read the document. The image processing circuit 13 is an integrated circuit (e.g., ASIC) for image processing. The image processing circuit 13 performs image processing of document image data.

The communication circuit 14 includes a communication control circuit and communication memory. The communication memory stores communication software. Based on the communication software, the communication control circuit controls communications. The communication circuit 14 communicates with a computer 200. The computer 200 is, for example, a PC or a server. The communication circuit 14 receives print data from the computer 200. Based on the received print data, the controller 1 instructs the printer section 5 to fulfill printing (print job). Also, the operation panel 4 accepts an address setting. The controller 1 instructs the communication circuit 14 to transmit image data based on document reading toward the set address (scan and transmission).

The storage part 2 includes RAM, ROM, and storage. The storage is provided, for example, as either one or both of an HDD and an SSD. Based on programs and data stored in the storage part 2, the controller 1 controls individual parts. The image reading part 3 includes a light source and an image sensor. The image reading part 3 reads documents.

The operation panel 4 is equipped with a display panel 41, a touch panel 42, and hard keys 43. The operation panel 4 accepts settings made by a user. The controller 1 instructs the display panel 41 to display massages, setting screens, and operational images. The operational images are, for example, buttons, keys, and tabs. Based on an output by the touch panel 42, the controller 1 recognizes an operational image that has been operated. The hard keys 43 include a start key and ten keys. The touch panel 42 and the hard keys 43 accept user's setting operations (job-related operations); for example, type of jobs to be executed and setting of set values for jobs are accepted. Based on an output by the operation panel 4, the controller 1 recognizes setting contents.

The multifunction peripheral 100 includes a printer section 5. The printer section 5 includes an engine controller 50, a sheet feed part 5a, a sheet conveyance part 5b, an image forming part 5c, an intermediate transfer part 5d, and a fixing part 5e. Based on a print instruction made by the controller 1, the engine controller 50 controls operations of the sheet feed part 5a, the sheet conveyance part 5b, the image forming part 5c, the intermediate transfer part 5d, and the fixing part 5e.

The sheet feed part 5a includes, for example, sheet cassettes 51 for housing set paper sheets, and sheet feed rollers 52 for feeding out a sheet. In printing, the engine controller 50 instructs the sheet feed part 5a to feed a sheet. The sheet conveyance part 5b includes, for example, a motor, conveyance roller pairs 53, and a conveyance guide 54. A space formed by the conveyance guide 54 serves as a path (sheet conveyance path 54a, space) for conveying a sheet. The engine controller 50 instructs the sheet conveyance part 5b to convey a sheet fed out from the sheet feed part 5a. A sheet to be used for printing passes through the sheet conveyance path 54a.

The image forming part 5c forms an image (toner image). As shown in FIGS. 2 and 3, the image forming part 5c includes four-color image forming units and an exposure device 56. The multifunction peripheral 100 includes an image forming unit 55B for forming black images, an image forming unit 55Y for forming yellow images, an image forming unit 55C for forming cyan images, and an image forming unit 55M for forming magenta images. It is noted that the image forming units 55B to 55M differ from one another in color of toner images formed by themselves. However, these image forming units 55B to 55M are identical in basic construction to one another. Therefore, reference signs B, Y, C and M that stand for colors will be omitted hereinbelow unless particular explanations related thereto are given.

Each of the image forming units includes a photosensitive drum 57, a charging device 58, and a developing device 59. In printing, the engine controller 50 instructs a drum motor (not shown) to rotate, with the photosensitive drum 57 rotated. Also, the engine controller 50 instructs the charging device 58 to electrically charge the photosensitive drum 57. Further, based on image data, the engine controller 50 instructs the exposure device 56 to make the photosensitive drum 57 optically exposed. The developing device 59 houses therein developer containing toner. The engine controller 50 instructs the developing device 59 to develop an electrostatic latent image of the photosensitive drum 57 with toner.

The intermediate transfer part 5d includes an intermediate transfer belt 510, a secondary transfer roller 511, a driving roller 512, primary transfer rollers 513B, 513Y, 513C, 513M, and driven rollers 514, 515. Axial directions of those rollers in the intermediate transfer part 5d are parallel to one another. The intermediate transfer belt 510 is endless. The intermediate transfer belt 510 is stretched over the individual rollers of the intermediate transfer part 5d. The intermediate transfer part 5d (intermediate transfer belt 510) receives primary transfer of a toner image from the photosensitive drum 57. Also, the intermediate transfer part 5d performs secondary transfer of the toner image onto a sheet.

The fixing part 5e includes a heater 516, and fixing rotators 517, 518. The engine controller 50 instructs the fixing rotators 517, 518 to heat and pressurize the sheet to which the toner image has been transferred. The engine controller 50 instructs the fixing part 5e to fix the toner image. The sheet conveyance part 5b discharges the after-fixation sheet outside the apparatus (onto a discharge tray 519).

(Sheet Reading Unit 6 and Registrationless Unit 7)

Figure 4:
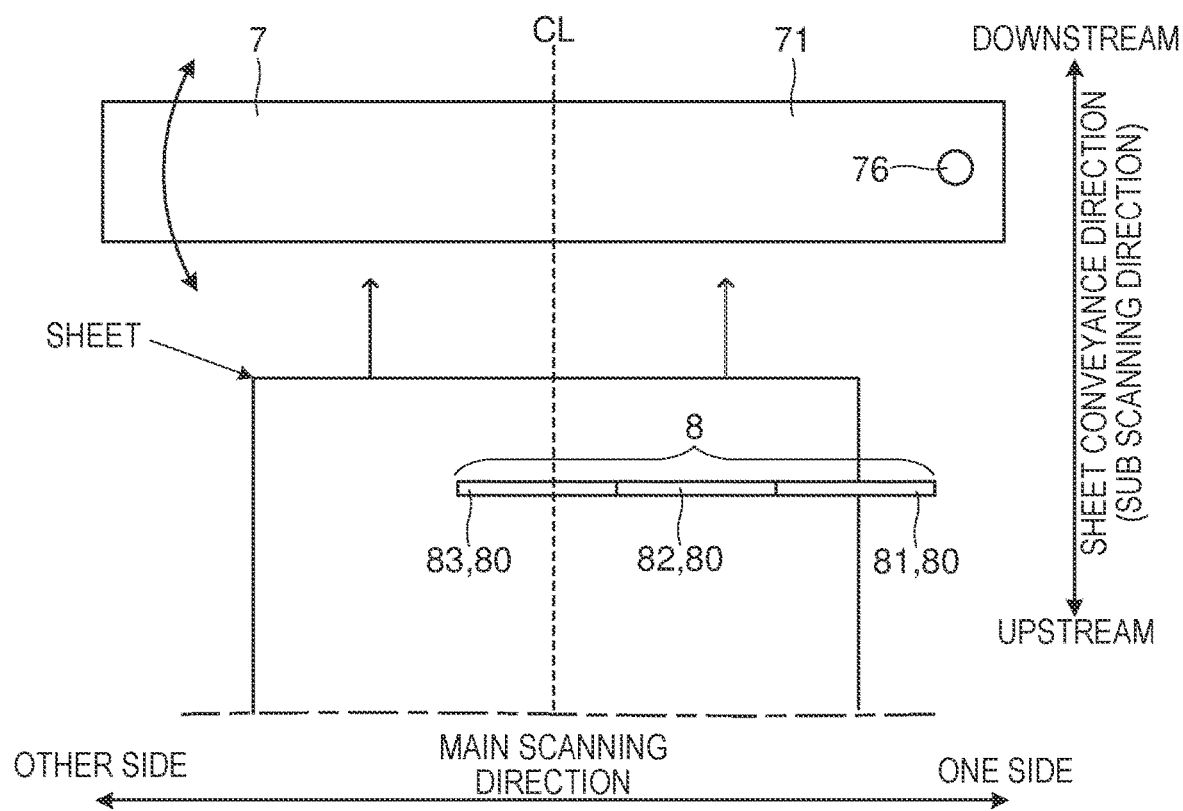
FIG. 4 is a view showing an example of the multifunction peripheral according to the embodiment.
Figure 5:
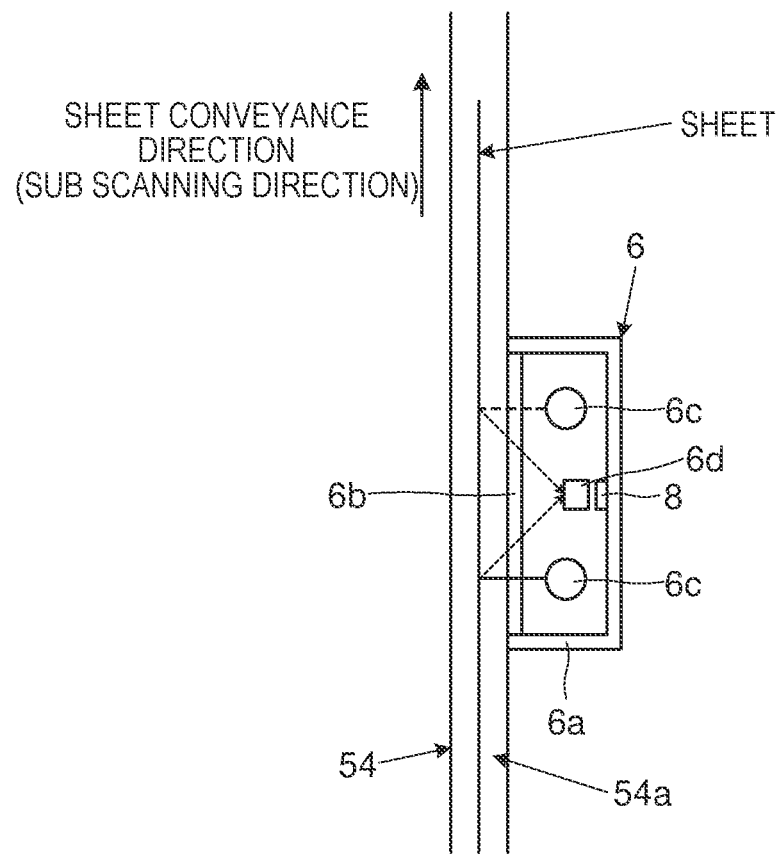
FIG. 5 is a view showing an example of a sheet reading unit according to the embodiment.
Figure 6A:
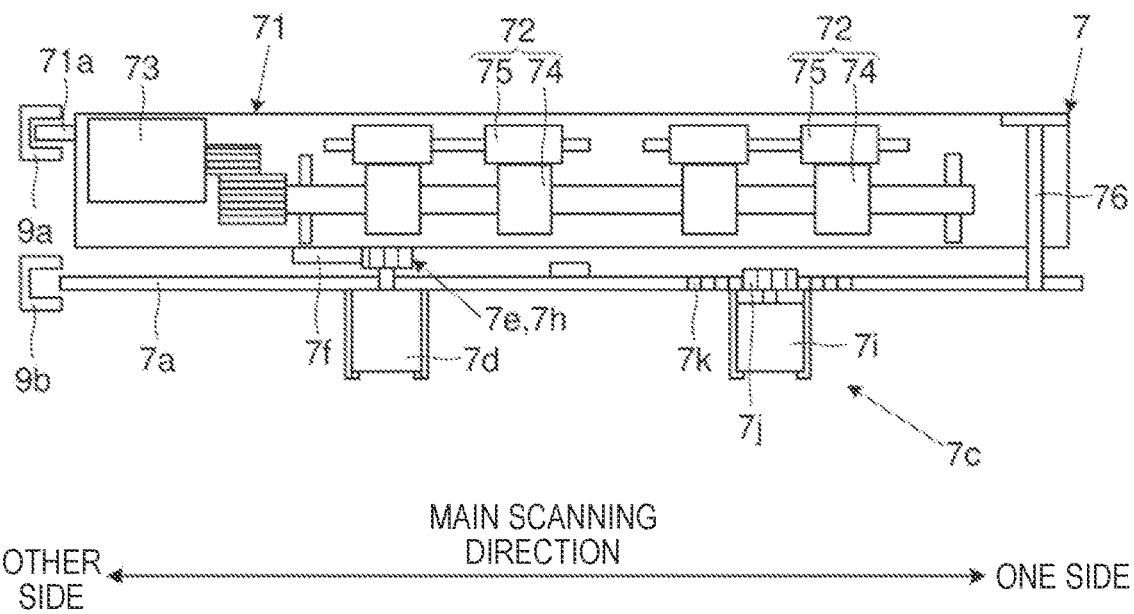
FIGS. 6A and 6B are views showing an example of a registrationless unit according to the embodiment.
Figure 6B:
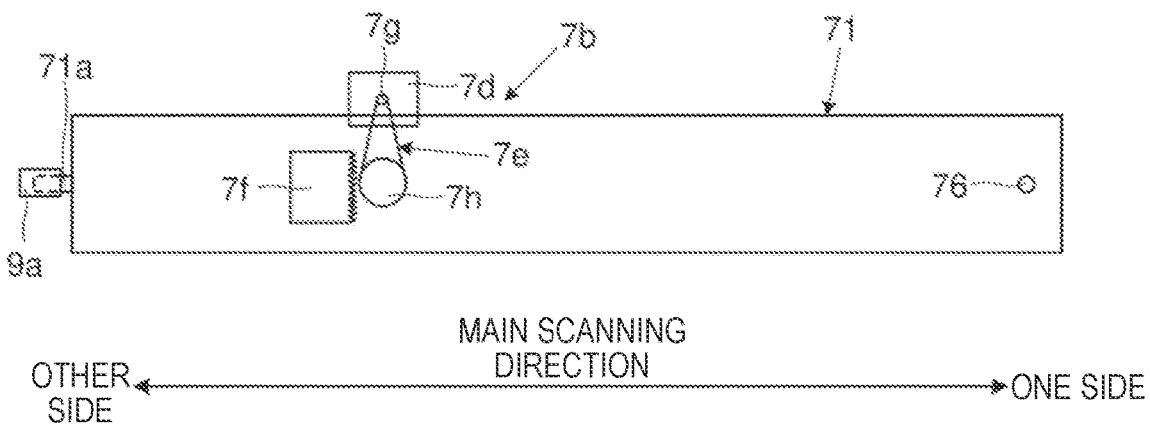
Figure 7:
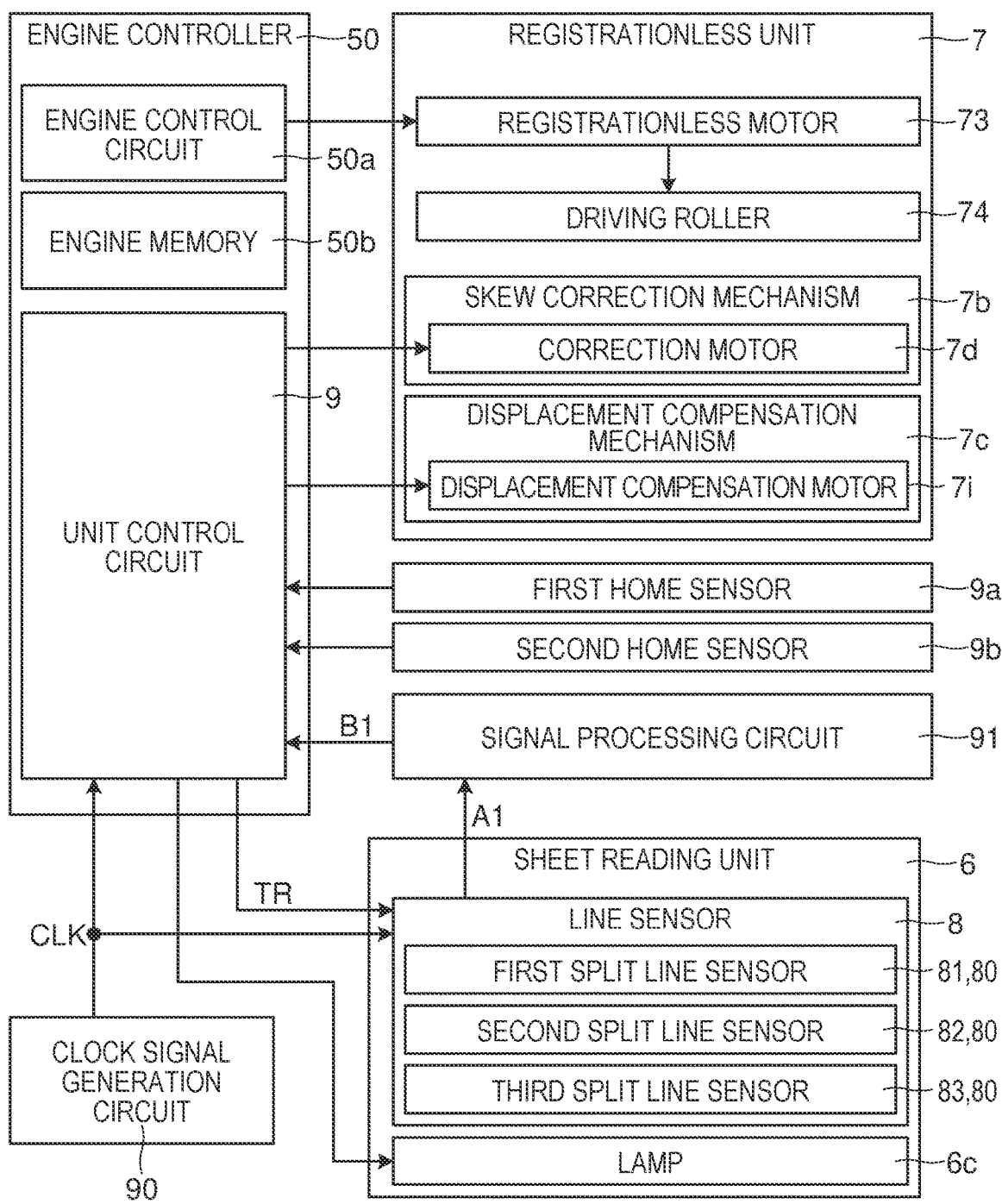
FIG. 7 is a diagram showing an example of the multifunction peripheral according to the embodiment.

Next, an example of a sheet reading unit 6 and a registrationless unit 7 according to the embodiment will be described with reference to FIGS. 4 to 7. FIG. 4 is a view showing an example of the multifunction peripheral 100 according to the embodiment. FIG. 5 is a view showing an example of the sheet reading unit 6 according to the embodiment. FIGS. 6A and 6B are views showing an example of the registrationless unit 7 according to the embodiment. FIG. 7 is a diagram showing an example of a multifunction peripheral 100 according to an embodiment.

The multifunction peripheral 100 includes a sheet reading unit 6 and a registrationless unit 7. The sheet reading unit 6 and the registrationless unit 7 are provided on a paper-sheet conveyance path (sheet conveyance path 54a). The sheet reading unit 6 reads a sheet under conveyance (conveyed sheet). The sheet reading unit 6 is provided sheet-conveyance upstream of the image forming part 5c (secondary transfer roller 511) (see FIG. 2). As shown in FIG. 5, a light-transmitting plate 6b is attached at one surface of the sheet reading unit 6. The light-transmitting plate 6b is a glass plate or a light-transmitting resin plate. Lamps 6c, a lens 6d, and a line sensor 8 are housed in a closed space formed by a casing 6a and the light-transmitting plate 6b. The sheet reading unit 6 is a scanner unit of the CIS system.

The engine controller 50 includes an engine control circuit 50a, engine memory 50b, and a unit control circuit 9. The engine memory 50b stores print-control programs and data. For example, the engine control circuit 50a and the unit control circuit 9 are provided as a CPU. The unit control circuit 9, receiving an instruction from the engine control circuit 50a, performs specified processing. In the multifunction peripheral 100, the unit control circuit 9 controls operations of the sheet reading unit 6 and the registrationless unit 7. It is noted that the engine control circuit 50a may control operations of either one or both of the sheet reading unit 6 and the registrationless unit 7. Further, the main control circuit 11 may control operations of either one or both of the sheet reading unit 6 and the registrationless unit 7.

FIG. 5 is a view of the sheet conveyance path 54a as viewed in the main scanning direction (a direction perpendicular to the sheet conveyance direction). The main scanning direction refers to a direction in which the line sensor 8 scans (reads). The main scanning direction is also a direction in which the light-receiving elements (pixels, photoelectric conversion elements) of the line sensor 8 are arrayed. In a print job, the unit control circuit 9 makes the lamps 6c lit. FIG. 5 shows an example in which the sheet reading unit 6 includes two lamps 6c. Each of the lamps 6c throws light along the main scanning direction. Each of the lamps 6c includes, for example, an LED.

The line sensor 8 includes a plurality of light-receiving elements. The pixels are arrayed in the main scanning direction. Light thrown from the lamps 6c and reflected by a document passes through the lens 6d to become incident on the pixels of the line sensor 8. In sheet conveyance (in a print job), the unit control circuit 9 instructs the line sensor 8 to execute reading. A reading width of the line sensor 8 is shorter than a width of a sheet that is a printable regular-size sheet and that is the largest in terms of main-scanning-direction width.

The line sensor 8 is split into a plurality of blocks. In other words, the line sensor 8 is equipped with a plurality of split line sensors 80. FIG. 4 shows a line sensor 8 including three blocks (split line sensors 80). A combination of three reading sensors may be used as the line sensor 8. In addition, the number of split line sensors 80 is not limited to three.

Each split line sensor 80 includes a plurality of light-receiving elements. The split line sensors 80 will be designated, for convenience' sake, as first split line sensor 81, second split line sensor 82, and third split line sensor 83 in an order starting with one side (right side in FIG. 4, fulcrum shaft 76 side) of the main scanning direction. Those split line sensors 80 are arrayed in a row (in one line). As a result, the light-receiving elements (pixels) of each split line sensor 80 are arrayed along the main scanning direction.

Under these circumstances, in the multifunction peripheral 100, a sheet is conveyed in a center passing system. The sheet feed part 5a (sheet cassettes 51) regulates position of the sheet in such fashion that a main-scanning-direction center of the sheet conveyance path 54a and a main-scanning-direction center of the conveyed sheet coincide with each other. As a result, the sheet conveyance part 5b conveys the sheet in such fashion that a main-scanning-direction center of the sheet conveyance path 54a and a main-scanning-direction center of the conveyed sheet coincide with each other. A broken line in FIG. 4 shows a main-scanning-direction center of the sheet and the sheet conveyance path 54a. The third split line sensor 83 is provided at a position appropriate for reading the main-scanning-direction center. When a sheet having the largest main-scanning-direction width is used, the first split line sensor 81 is provided at a position appropriate for reading a one-side end of the main scanning direction. The second split line sensor 82 is placed between the first split line sensor 81 and the third split line sensor 83.

The unit control circuit 9 inputs a trigger signal TR to each of the split line sensors 80. Each split line sensor 80 includes a charge transfer circuit (shift register, transfer CCD). In accordance with the trigger signal TR, charges accumulated in the individual pixels are transferred to the charge transfer circuit. The charge transfer circuit converts charges into voltages. A period of the trigger signals TR becomes a period of one scan.

The multifunction peripheral 100 includes a clock signal generation circuit 90. The clock signal generation circuit 90 generates a read clock signal CLK. The clock signal generation circuit 90 inputs the read clock signal CLK to each split line sensor 80. For each one read clock signal CLK, each split line sensor 80 outputs analog image signals A1 for one pixel. The read clock signals CLK are issued at a frequency that allows one split line sensor 80 to send out the analog image signals A1 for the whole pixels during one cycle period of the trigger signals TR.

The registrationless unit 7 is provided at a position where a registration roller pair would be provided in conventional image forming apparatuses (see FIG. 2). Upon arrival of an end of a sheet, the conventional registration roller pair is at a stop. Any skew of the sheet is corrected by letting the sheet bump against the stopped registration roller pair. However, use of the registration roller pair would involve a temporary stop of the sheet. Therefore, the registrationless unit 7 corrects any skew of the sheet without stopping the sheet, and conveys the sheet downstream. The registrationless unit 7 is provided sheet-conveyance upstream of the image forming part 5c (secondary transfer nip 5n, secondary transfer roller 511) (see FIG. 2). The registrationless unit 7 is provided sheet-conveyance downstream of the sheet reading unit 6.

FIGS. 6A and 6B show an example of the registrationless unit 7. As shown in FIGS. 6A and 6B, the registrationless unit 7 includes a casing 71 and a moving plate 7a. A gap is provided between the casing 71 and the moving plate 7a. In the case of FIGS. 6A and 6B, the casing 71 is of a box type. The moving plate 7a is plate-shaped. Both the casing 71 and the moving plate 7a have their longitudinal directions along the main scanning direction. The moving plate 7a and a bottom surface (one surface closer to the moving plate 7a) of the casing 71 are parallel to each other. FIG. 6A is an example of view as seen from sheet-conveyance upstream side (underside of multifunction peripheral 100) in FIG. 2. FIG. 6B is a view showing one surface of the casing 71 facing the moving plate 7a (with moving plate 7a unshown).

The casing 71 houses registrationless roller pairs 72 and a registrationless motor 73. Each registrationless roller pair 72 includes a driving roller 74 and a driven roller 75. A rotational axis of the driving roller 74 and a rotational axis of the driven roller 75 are parallel to each other. A circumferential surface of the driving roller 74 and a circumferential surface of the driven roller 75 are in contact with each other. As shown in FIG. 2, a sheet is conveyed from below toward above. The conveyed sheet enters a nip between the driving roller 74 and the driven roller 75. Driving force of the registrationless motor 73 is transmitted to each driving roller 74 by a plurality of gears. Rotating the registrationless motor 73 causes the registrationless roller pairs 72 to rotate. As a result, the conveyed sheet passes through the registrationless unit 7 (nip).

A fulcrum shaft 76 (supporting point, pivoting shaft) is provided on the moving plate 7a. One end of the fulcrum shaft 76 is inserted and fixed into the moving plate 7a. The fulcrum shaft 76 stands vertical on a plane of the moving plate 7a. The fulcrum shaft 76 is inserted into an end portion of the casing 71 on one side of the main scanning direction (a direction perpendicular to the sheet conveyance direction). The fulcrum shaft 76 allows the other-side end portion of the casing 71 (a portion of the registrationless unit 7) to be swung. The fulcrum shaft 76 also allows the casing 71 (a portion of the registrationless unit 7) to be rotated. The other-side end of the casing 71 can be swung toward the sheet-conveyance downstream side or upstream side, as indicated by solid-line arrows in FIG. 4.

The registrationless unit 7 includes a skew correction mechanism 7b and a displacement compensation mechanism 7c. For skew correction of a conveyed sheet, the skew correction mechanism 7b moves the other side (moving side) of the casing 71. The skew correction mechanism 7b includes a correction motor 7d, a correction belt 7e, and a correction tooth-surface member 7f.

The correction motor 7d is, for example, a stepping motor. The correction motor 7d is attached to the moving plate 7a. The correction motor 7d is rotatable both forward and reverse. A first correction gear 7g is provided on a shaft of the correction motor 7d. The correction tooth-surface member 7f (rack teeth) is attached to a surface of the casing 71 facing the moving plate 7a. Teeth of the correction tooth-surface member 7f are arrayed along the sheet conveyance direction. The correction tooth-surface member 7f is meshed with a second correction gear 7h. The correction belt 7e is stretched over the first correction gear 7g and the second correction gear 7h. Rotating the correction motor 7d causes the first correction gear 7g, the correction belt 7e and the second correction gear 7h to be rotated. As a result, the casing 71 with the correction tooth-surface member 7f attached thereto is rotated around the fulcrum shaft 76.

The other side of the registrationless unit 7 (casing 71, registrationless roller pairs 72) can be moved in a direction perpendicular to the main scanning direction (in the sheet conveyance direction). A moving extent of the other-side end portion of the registrationless unit 7 (casing 71) by the skew correction mechanism 7b may be about a few to five millimeters for upstream side and about a few to five millimeters for downstream side in the conveyance direction with a first home position (first reference position) taken as a center. Details of the first home position will be described later.

The displacement compensation mechanism 7c includes a displacement compensation motor 7i. The displacement compensation motor 7i is, for example, a stepping motor. The displacement compensation motor 7i is attached to the moving plate 7a. The displacement compensation motor 7i is rotatable both forward and reverse. A displacement compensation gear 7j is provided on a shaft of the displacement compensation motor 7i. The displacement compensation gear 7j is meshed with a compensation tooth-surface member 7k (rack teeth) formed at an end edge of the moving plate 7a. Rotating the displacement compensation motor 7i causes the displacement compensation motor 7i and the displacement compensation gear 7j to be rotated.

As a result, the registrationless unit 7 (moving plate 7a and casing 71) is moved in the main scanning direction. Displacement amount of the conveyed sheet in the main scanning direction is about a few millimeters at the maximum. A moving range of the registrationless unit 7 in the main scanning direction by the displacement compensation mechanism 7c is about a few to five millimeters for one side of the main scanning direction and about a few to five millimeters for the other side with a second home position (second reference position) taken as a center. For example, the displacement compensation mechanism 7c is enabled to move the registrationless unit 7 by two millimeters toward the one side and the other side, respectively, with the second home position taken as a center.

Next, the first home position will be explained. The first home position is such a position (angle) of the casing 71 that an axial direction of each registrationless roller pair 72 and the main scanning direction become parallel to each other. In the first home position, the conveyed sheet is fed in a direction parallel to the sheet conveyance direction and perpendicular to the main scanning direction. In terms of positioning the registrationless unit 7 (casing 71) at the first home position, a first home sensor 9a is provided. The first home sensor 9a is a sensor for adjusting a rotational-direction position of the casing 71 to the first home position.

For example, a transmission type optical sensor may be used as the first home sensor 9a. In this case, the first home sensor La includes a light-emitting element and a light-receiving element. A gap is provided between a light-emitting surface of the light-emitting element and a light-receiving surface of the light-receiving element. Output level (output voltage value) of the light-receiving element varies depending on quantity of light received from the light-emitting element. A sensing protrusion 71a is provided in the registrationless unit 7 (casing 71). FIGS. 6A and 6B show an example in which a sensing protrusion 71a is provided at an end portion of the casing 71 on the other side (moving side) of the main scanning direction. The first home sensor 9a is provided at a position facing the sensing protrusion 71a. As the registrationless unit 7 (casing 71) is rotated, the sensing protrusion 71a passes through the gap of the first home sensor 9a. The sensing protrusion 71a having entered the gap interrupts an optical path from the light-emitting element to the light-receiving element.

An output of the first home sensor 9a (light-receiving element) is inputted to the unit control circuit 9. The unit control circuit 9 recognizes an output level of the first home sensor 9a (light-receiving element). Based on a time point when the output level of the first home sensor 9a has come to a level corresponding to sensing of the sensing protrusion 71a after activation of the correction motor 7d, the unit control circuit 9 sets the registrationless unit 7 (casing 71) to the first home position. For example, the unit control circuit 9 makes the correction motor 7d rotated reverse to lift the casing 71. At a time point when the output level of the first home sensor 9a has come to a level corresponding to sensing of the sensing protrusion 71a, the unit control circuit 9 makes the correction motor 7d stopped from rotating and thereafter rotated forward. After making the correction motor 7d rotated forward to an extent of specified pulses, the unit control circuit 9 stops the correction motor 7d. At the time of the stop, the registrationless unit 7 (casing 71) is set to the first home position.

For example, when the multifunction peripheral 100 has been activated with main power supply turned on or when the multifunction peripheral 100 has been restored to active mode (normal mode) with power-saving mode canceled, the unit control circuit 9 sets the registrationless unit 7 (casing 71) to the first home position.

As shown in FIG. 2, the registrationless unit 7 is installed so as to allow a sheet to pass therethrough from below to above. Therefore, while the correction motor 7d remains unexcited, the main-scanning-direction other side of the casing 71 tends to go down by its self weight. While the casing 71 is maintained in the first home position, the unit control circuit 9 makes the correction motor 7d excited. As a result, the registrationless unit 7 (casing 71) is maintained unchanged in position.

The registrationless unit 7 can also be moved in the main scanning direction. For this purpose, a second home position as well is predetermined. The second home position is a home position of the moving plate 7a (registrationless unit 7) in the main scanning direction. For example, a center position of the main-scanning-direction moving range of the registrationless unit 7 (moving plate 7a) may be set as the second home position. The second home position is a position in which the registrationless unit 7 (moving plate 7a) can be moved toward both the one side and the other side of the main scanning direction.

With a view to setting the registrationless unit 7 (moving plate 7a) to the second home position, a second home sensor 9b is provided. The second home sensor 9b may be provided at an end of the moving plate 7a on the other side (one side also allowable) of the main scanning direction.

For example, a transmission type optical sensor may be used as the second home sensor 9b. In this case, the second home sensor 9b includes a light-emitting element and a light-receiving element. A gap is provided between a light-emitting surface of the light-emitting element and a light-receiving surface of the light-receiving element. Output level (output voltage value) of the light-receiving element varies depending on quantity of light received from the light-emitting element.

The second home sensor 9b is provided at such a position that the other-side end of the moving plate 7a enters the gap when the registrationless unit 7 has moved toward the other side to the utmost. The second home sensor 9b is a sensor for sensing that the registrationless unit 7 (moving plate 7a) has moved toward the other side of the main scanning direction to the utmost.

An output of the second home sensor 9b (light-receiving element) is inputted to the unit control circuit 9. The unit control circuit 9 recognizes an output level of the second home sensor 9b (light-receiving element). In order to set the registrationless unit 7 (moving plate 7a) to the second home position, the unit control circuit 9 makes the displacement compensation motor 7i operate so that the moving plate 7a is moved toward the other side of the main scanning direction. When the output level of the second home sensor 9b has come to a level corresponding to sensing of the main-scanning-direction end of the moving plate 7a, the unit control circuit 9 makes the registrationless unit 7 (moving plate 7a) moved to a specified distance toward the one side of the main scanning direction and toward the center position of the moving range in the main scanning direction.

(Signal Processing Circuit 91)

Figure 8:
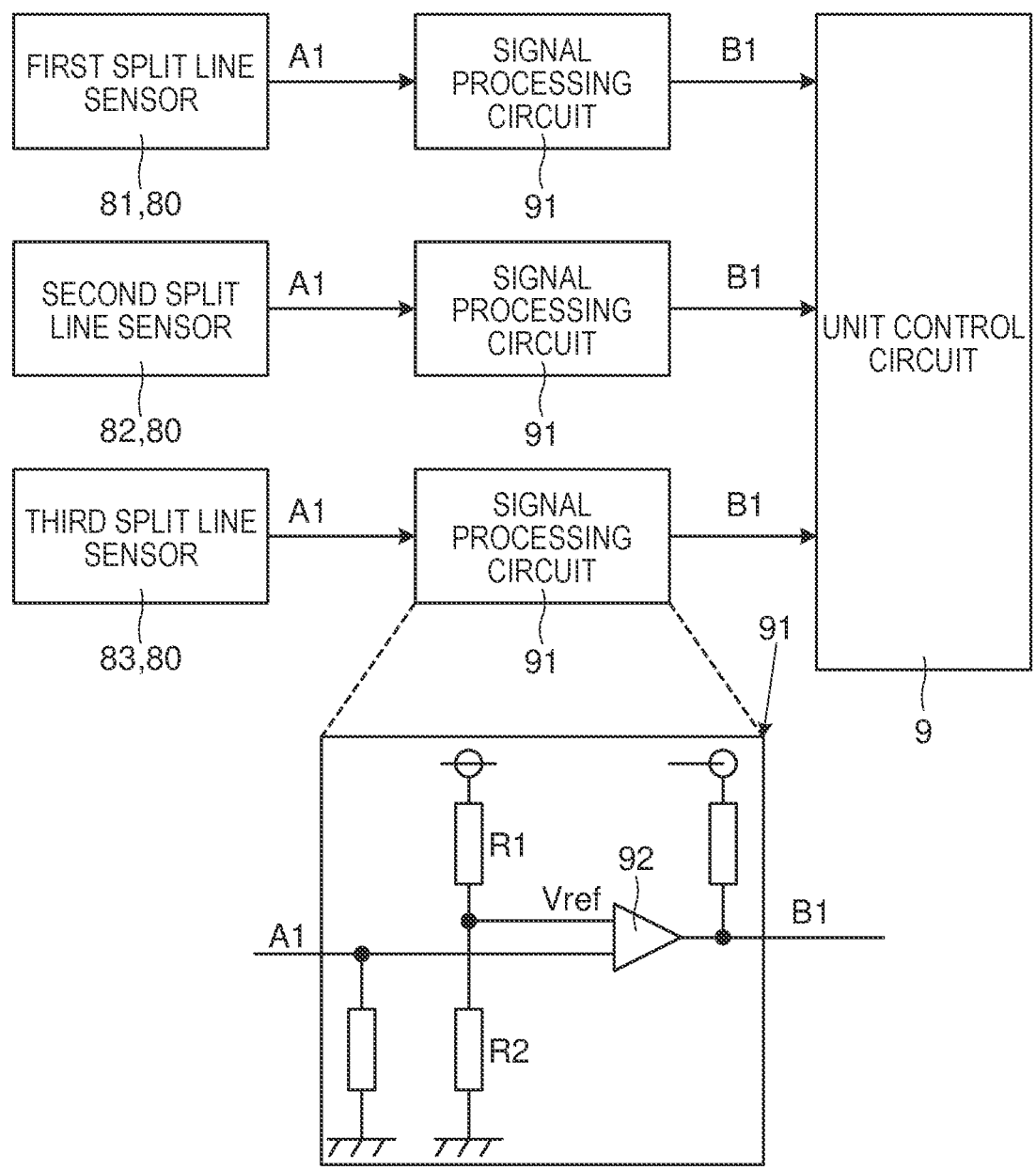
FIG. 8 is a diagram showing an example of circuits included in the multifunction peripheral according to the embodiment.

Next, an example of a signal processing circuit 91 according to the embodiment will be described with reference to FIG. 8. FIG. 8 is a diagram showing an example of circuits included in the multifunction peripheral 100 according to the embodiment.

The multifunction peripheral 100 includes signal processing circuits 91. Each signal processing circuit 91 processes and transforms analog image signals A1, which have been outputted by the individual split line sensors 80, to generate image data B1. The image data B1 are signals indicating whether or not a conveyed sheet on the sheet reading unit 6 (light-transmitting plate 6b) has been read.

An analog image signal A1 derived from a pixel subjected to reading of a conveyed sheet increases in voltage value. It is indicated that the larger the voltage value of the analog image signal A1 becomes, the brighter (whiter, lighter-colored) the reading result is. Conversely, the voltage value of a pixel-base analog image signal A1 resulting from reading of a portion including no conveyed sheet becomes smaller. The voltage value of a pixel-base analog image signal A1 resulting from reading of the conveyed sheet becomes larger than the voltage value of a pixel-base analog image signal A1 resulting from reading of no conveyed sheet.

The signal processing circuit 91 generates image data B1 based on individual pixel-base analog image signals A1. More specifically, the signal processing circuit 91 of the multifunction peripheral 100 is a binarization circuit. The image data B1 is data (signals) obtained by conversion process in which the signal processing circuit 91 (binarization circuit) has converted the pixel-base analog image signals A1 into binarization signals. That is, the image data B1 is image data of each split line sensor. The image data B1 is obtained on a basis of each split line sensors 80.

When a voltage value of the analog image signal A1 is larger than a predetermined threshold value Vref, the signal processing circuit 91 (binarization circuit) outputs image data B1 of High level. When the voltage value of the analog image signal A1 is equal to or smaller than the threshold value Vref, the signal processing circuit 91 (binarization circuit) outputs image data B1 of Low level. Binarized image data B1 (one-bit-for-one-pixel monochrome image data) is obtained by the signal processing circuit 91.

The line sensor 8 includes the first split line sensor 81, the second split line sensor 82, and the third split line sensor 83. The signal processing circuit 91 (binarization circuit) is provided for each one of the split line sensors 80. Pixel-base analog image signals A1 of the first split line sensor 81 are inputted to a first signal processing circuit 91. Pixel-base analog image signals A1 of the second split line sensor 82 are inputted to a second signal processing circuit 91. Pixel-base analog image signals A1 of the third split line sensor 83 are inputted to a third signal processing circuit 91.

Those signal processing circuits 91 are of identical configuration. An example of the signal processing circuit 91 is shown in lower part of FIG. 8. The signal processing circuit 91 includes a comparator 92 and a plurality of resistors. Outputs (analog image signals A1) of the line sensor 8 are inputted to one input terminal of the comparator 92 sequentially pixel by pixel. A reference voltage (threshold value Vref) generated by voltage division of a first resistor R1 and a second resistor R2 is inputted to the other input terminal of the comparator 92.

The comparator 92 performs binarization of the analog image signals A1. When a voltage value of an analog image signal A1 is larger than the reference voltage, the comparator 92 outputs image data B1 of High level. The High level is a level indicating that the conveyed sheet has been read. When the voltage value of the analog image signal A1 is equal to or smaller than the reference voltage, the comparator 92 outputs image data B1 of Low level. The Low level is a level indicating that the conveyed sheet has not been read.

Outputs (image data B1) of the individual signal processing circuits 91 are inputted to the unit control circuit 9. The unit control circuit 9 acquires binary image data (monochrome image data, image data B1) generated by the individual signal processing circuits 91. The unit control circuit 9 is enabled to recognize what-ordinal-numbered pixels in each split line sensor 80 are of High level, and what-ordinal-numbered pixels in each split line sensor 80 are of Low level. Based on the image data B1, for example, the unit control circuit 9 is enabled to recognize (determine) a skew direction and a skew angle of the conveyed sheet.

(Recognition of Skew Angle of Conveyed Sheet)

Next, an example of recognition of a skew angle of a conveyed sheet based on image data B1 will be explained below. With a view to determining a skew angle of a conveyed sheet, two pixels (reference-point pixels) are predetermined. The reference-point pixels are pixels of two points within the split line sensors 80. The two reference-point pixels may also be provided within a readable range of a minimum sheet out of regular-size sheets that are usable for printing. Also, a main-scanning-direction distance between the reference-point pixels may be larger than one half of a main-scanning-direction width of a minimum sheet usable for printing. Positions of the reference-point pixels may differ among individual sheet sizes.

When there is coincidence between time points (lines) at which fore ends of a conveyed sheet have been read (High levels have been reached) at the two reference-point pixels, the unit control circuit 9 recognizes that the skew angle is zero. When either one of the two points has gone High level earlier than the other, the unit control circuit 9 recognizes that the conveyed sheet is skewed. When one reference-point pixel on one side of the main scanning direction has gone High level earlier than the other reference-point pixel, the unit control circuit 9 recognizes that a corner of the conveyed sheet on the one side of the main scanning direction is skewed in a downstream-protruding direction. When the reference-point pixel on the other side of the main scanning direction has gone High level earlier than that of the one side, the unit control circuit 9 recognizes that a corner of the conveyed sheet on the other side of the main scanning direction is skewed in a downstream-protruding direction.

In a case where the conveyed sheet is skewed, the unit control circuit 9 may determine a skew angle by calculating an arctangent ($\tan^{-1}$). More specifically, the unit control circuit 9 may perform the following calculation:

$$\text{skew angle} = \tan^{-1}(a/b)$$

where symbol 'a' is a conveyance distance from when one reference-point pixel goes High level until when the other reference-point pixel goes High level. For example, the unit control circuit 9 determines 'a' by multiplying a number of lines, which counts from when one reference-point pixel goes High level until when the other reference-point pixel goes High level, by a one-line period and a sheet conveyance velocity per unit time. Symbol 'b' is a distance in the main scanning direction (main-scanning-direction component) between the two reference-point pixels. Multiplying the number of pixels ranging from one reference-point pixel to the other reference-point pixel by a one-pixel pitch allows 'b' to be determined. A skew angle is determined based on a right-angled triangle having a height of 'a' and a base of 'b'.

In a print job, the unit control circuit 9 may complete the move of a sheet from the home position to the correction position before the sheet enters the registrationless unit 7 (registrationless roller pairs 72).

(1) A Case where a Corner of a Sheet on One Side (Fulcrum Shaft 76 Side) of the Main Scanning Direction is Protruded Toward the Downstream Side of the Conveyance Direction Before arrival of a fore end of a conveyed sheet, the unit control circuit 9 makes an other-side (moving-side) end portion of the registrationless unit 7 (casing 71) moved toward the upstream side of the sheet conveyance direction. A position to which the registrationless unit 7 has been moved (pivoted) by an angle equal to the skew angle from the first home position corresponds to the correction position.

(2) A Case where a Corner on the Other Side (Moving Side) of the Main Scanning Direction is Protruded Toward the Downstream Side of the Conveyance Direction Before arrival of a fore end of a conveyed sheet, the unit control circuit 9 makes the other-side end portion of the registrationless unit 7 (casing 71) moved toward the downstream side of the sheet conveyance direction. A position to which the registrationless unit 7 has been moved (pivoted) by an angle equal to the skew angle from the first home position corresponds to the correction position.

When the conveyed sheet has entered the registrationless roller pairs 72, the unit control circuit 9 makes the registrationless unit 7 (casing 71) moved (returned) from the correction position to the first home position. Before arrival of the conveyed sheet at the secondary transfer nip 5n, the unit control circuit 9 makes the move to the first home position completed. Returns to each home position make it possible to correct any skew of the conveyed sheet while keeping sheet conveyance continued.

(Recognition of Displacement Quantity of Conveyed Sheet in Main Scanning Direction)

Next, an example of recognition of main-scanning-direction displacement quantity of a conveyed sheet based on the image data B1 will be explained. With the center passing system adopted, an ideal position through which an edge (end edge) of a sheet passes is predetermined for each sheet size. In other words, on condition that a conveyed sheet is not displaced in the main scanning direction, a position of a pixel for reading a sheet end is determinate.

The unit control circuit 9 determines, as an actual edge position, a position of the High-level pixel located endmost (on the utmost one side) in the main scanning direction out of the image data B1. The actual edge position refers to a position of an actual end of a conveyed sheet in the main scanning direction. Then, the storage part 2 stores, in non-volatile fashion, data (displacement-quantity recognition data D1) defining a position of a pixel located at a sheet end with no displacement in the main scanning direction on a basis of each sheet size (FIG. 1). The unit control circuit 9 recognizes how many pixels and in which direction a position of the low-intensity pixel (pixel with analog image signal A1 equal to or lower than reference voltage) located at an utmost end of the conveyed sheet is displaced from a position defined by the displacement-quantity recognition data D1. The unit control circuit 9 is enabled to recognize a displacement direction (which the displacement is directed toward one side or toward the other side of the main scanning direction). Also, the unit control circuit 9 determines a displacement quantity in the main scanning direction by multiplying a number of displacement pixels by a one-pixel pitch of the image data B1.

(1) A Case where Sheet Position is Displaced Toward One Side (Fulcrum Shaft 76 Side) of Main Scanning Direction Before arrival of a fore end of a conveyed sheet, the unit control circuit 9 makes the registrationless unit 7 (moving plate 7a) moved by a recognized displacement quantity toward the one side of the main scanning direction.

(2) A Case where Sheet Position is Displaced Toward the Other Side (Moving Side) of Main Scanning Direction Before arrival of a fore end of a conveyed sheet, the unit control circuit 9 makes the registrationless unit 7 (moving plate 7a) moved by a recognized displacement quantity toward the other side of the main scanning direction.

When the conveyed sheet has entered the registrationless roller pairs 72 after the move of the moving plate 7a, the unit control circuit 9 makes the registrationless unit 7 (casing 71) moved from the correction position to the second home position. The unit control circuit 9 makes the move to the second home position completed before the conveyed sheet arrives at the secondary transfer nip 5n. A return to the second home position makes it possible to correct any displacement in the main scanning direction while keeping the sheet conveyance continued.

(Placement of Split Line Sensors 80)

Next, an example of placement of the split line sensors 80 according to the embodiment will be described with reference to FIG. 9. FIG. 9 is a diagram showing an example of placement of the split line sensors 80 according to the embodiment.

FIG. 9 shows an example of a diagram in which the split line sensors 80 are viewed in a direction perpendicular to the main scanning direction as well as perpendicular to the sheet conveyance direction (sub scanning direction). There are ideal edge positions for each one of usable regular sizes. An ideal edge position refers to a position of an edge of a sheet in the main scanning direction under the condition that the conveyed sheet is not displaced. The multifunction peripheral 100 is ready for use of plural regular sizes of sheets. In other words, the multifunction peripheral 100 supports a plurality of regular sizes. In the displacement-quantity recognition data D1, positions of pixels corresponding to the ideal edge positions are determined for each one of the usable regular sizes.

Vertical broken lines in FIG. 9 denote an example of the ideal edge positions for usable regular-size sheets. A vertical solid line in FIG. 9 is a line (center line CL) through which a main-scanning-direction center of the sheet conveyance path 54a as well as a center of a conveyed sheet having no displacement in the main scanning direction pass.

Ideally, there should be no displacement of a conveyed sheet in the main scanning direction. However, it is difficult to completely eliminate such displacements. Therefore, in the multifunction peripheral 100, a permissible value for displacement quantity in the main scanning direction is predetermined. The permissible value is an upper-limit value of a permissible range for displacement quantity of a conveyed sheet in the main scanning direction. The permissible value is, for example, a few millimeters. The permissible value may be 2 mm or 3 mm. In addition, the permissible value may be shorter than 2 mm or longer than 3 mm.

Each sheet cassette 51 (sheet feed part 5a) regulates positions of paper sheets to be housed therein. The sheet cassette 51 includes, for example, a regulating plate. The regulating plate, for example, regulates the position of a sheet in order that a main-scanning-direction center of the sheet conveyance path 54a and a center of the sheet concur with each other. However, sheets set in the sheet cassette 51 may be displaced in position more or less. Also, due to slips at roller pairs in the sheet conveyance, sheets may be displaced more or less in main-scanning-direction position. Even with these taken into consideration, the multifunction peripheral 100 is so designed that any displacement quantity of a conveyed sheet in the main scanning direction is kept from exceeding the permissible value. Normally, displacement quantity from the ideal edge position toward one side or the other side of the main scanning direction is up to the permissible value at the most. It is not the case, however, that displacements in the main scanning direction exceeding the permissible value do not occur at all. Also, it is not the case that displacements in the main scanning direction exceeding the permissible value are not permitted at all.

Then, the line sensor 8 is placed so as to read an edge of a sheet of a maximum size out of usable regular sizes. In other words, a sheet of the supported maximum size passes through on a sensing surface (light-receiving elements) of the line sensor 8. As an example, a regular-size sheet of the supported maximum size is a sheet having a main-scanning-direction width of 13 inches.

Below described is a case where the maximum size of main-scanning-direction width of a usable regular-size sheet is 13 inches. The length of 13 inches is equivalent to about 330.2 mm. Given a permissible value of 2 mm, readable width of the line sensor 8 is set to a length that is shorter than the maximum size and that allows a center of the sheet to be read and moreover that allows a one-side edge of the conveyed sheet to be read even in a state of a main-scanning-direction displacement of 2 mm. In the case of FIG. 9, when a regular-size sheet of a supported maximum size is conveyed, the first split line sensor 81 reads the main-scanning-direction one-side edge of the conveyed sheet.

In this connection, there are gaps between the first split line sensor 81 and the second split line sensor 82 as well as between the second split line sensor 82 and the third split line sensor 83. In FIG. 9, those gaps are indicated by double lines. Each of the gaps actually has a minute width in the main scanning direction. The width is, for example, 0.1 mm or less. Gaps shown in FIG. 9 are expressed wider than actual for emphasis.

Hereinbelow, the gap between the first split line sensor 81 and the second split line sensor 82 will be designated as first gap W1. Also, the gap between the second split line sensor 82 and the third split line sensor 83 will be designated as second gap W2. The first gap W1 and the second gap W2 are gaps resulting from connecting the split line sensors 80 with one another. There are no light-receiving elements (pixels) in these gaps.

The split line sensors 80 (first split line sensor 81, second split line sensor 82, and third split line sensor 83) are placed at non-stretching positions, respectively. The terms, non-stretching position, refer to such a position that a main-scanning-direction distance between an ideal edge position of a sheet of every usable regular size and the first gap W1 exceeds the permissible value. Also, the terms, non-stretching position, refer to such a position that a main-scanningdirection distance between an ideal edge position of a sheet of every usable regular size and the second gap W2 exceeds the permissible value.

That is, each split line sensor 80 is placed at such a position that as in the main scanning direction, a distance between the ideal edge position and the first gap as well as a distance between the ideal edge position and the second gap become larger than the permissible value. For placement at each non-stretching position, the first split line sensor 81, the second split line sensor 82, and the third split line sensor 83 may differ from one another in terms of main-scanning-direction length and number of light-receiving elements.

In the case shown in FIG. 9, the sheet having the shortest distance between the ideal edge position and the gap is 16K sheet. It is the first split line sensor 81 that reads an edge of the 16K sheet. Then, a distance between the ideal edge position for 16K and the second gap W2 is longer than the permissible value. Therefore, even when the conveyed sheet is displaced in the main scanning direction, the edge of the 16K sheet does not fall within a readable range of the second split line sensor 82. The sheet edge does not stretch over the gap.

In a case where the distance between the ideal edge position and the first gap as well as the distance between the ideal edge position and the second gap are smaller than the permissible value, there is a possibility that the edge of the conveyed sheet may stretch over the gap. However, placing each split line sensor 80 at a non-stretching position keeps the edge of the conveyed sheet from stretching over the gap. There is no need for checking image data B1 of two split line sensors 80 in order to recognize an actual edge position of a sheet.

In the case of FIG. 9, with Commercial, C5R, B5R and Executive sheets used, checking only the image data B1 based on analog image signals A1 of the second split line sensor 82 allows the unit control circuit 9 to determine an actual edge position. Also, in a case where sheets of 16K, A4R, C4R, B5E, and 13 inches are used, checking the image data B1 based on analog image signals A1 of the first split line sensor 81 allows the unit control circuit 9 to determine an actual edge position.

The operation panel 4 accepts a size of a sheet to be used. The controller 1 recognizes a set sheet size. The unit control circuit 9 is enabled to recognize a sheet size to be printed (conveyed). For determination of an actual edge position, the unit control circuit 9 determines the actual edge position based on either one of image data B1 out of image data B1 based on the analog image signals A1 of the second split line sensor 82 and image data B1 based on the analog image signals A1 of the first split line sensor 81. That is, the unit control circuit 9 determines an actual edge position based on only the image data B1 of a split line sensor 80 whose readable range overlaps with the ideal edge position of the conveyed sheet in the main scanning direction out of the split line sensors 80.

More specifically, one of the plural split line sensors 80 is placed at a position through which a center of the conveyed sheet passes (third split line sensor 83). The unit control circuit 9 determines an actual edge position based on image data B1 of one split line sensor 80 out of the split line sensors 80 (first split line sensor 81 or second split line sensor 82) placed outside the third split line sensor 83 as in the main scanning direction.

In addition, it cannot be completely denied that a determined displacement quantity in the main scanning direction may exceed the permissible value. In this case, the unit control circuit 9 may determine a value equal to the permissible value as a main-scanning-direction displacement quantity of the conveyed sheet. That is, the upper-limit value of main-scanning-direction displacement quantity to be determined may be the permissible value. Then, the unit control circuit 9 may instruct a lateral-displacement compensation mechanism to move the casing 71 to an extent of distance equivalent to the permissible value.

As described hereinabove, the image forming apparatus (multifunction peripheral 100) according to the embodiment includes a sheet conveyance part 5b, an image forming part 5c, and a sheet reading unit 6. The sheet conveyance part 5b conveys a sheet. The image forming part 5c forms an image on the conveyed sheet. The sheet reading unit 6 includes lamps 6c and a line sensor 8. The lamps 6c throw light onto the conveyed sheet. The line sensor 8 reads the conveyed sheet. The sheet reading unit 6 is provided upstream of the image forming part 5c in a sheet conveyance direction. The line sensor 8 includes a plurality of split line sensors 80. Those split line sensors 80 are arrayed in a row. Light-receiving elements of each of the split line sensors 80 are arrayed along a main scanning direction. The split line sensors 80 are placed at non-stretching positions, respectively. Each non-stretching position is such a position that as in the main scanning direction, a main-scanning-direction distance from a gap between one split line sensor 80 and another split line sensor 80 to an ideal edge position of every usable regular size exceeds a permissible value. The ideal edge position is such a position of an edge of a conveyed sheet under the condition that there is no displacement in the main scanning direction. The permissible value is a predetermined value. The permissible value is, for example, an upper-limit value of a permissible range for displacement of conveyed sheets in the main scanning direction.

Even with a displacement in the main scanning direction, a main-scanning-direction edge of a conveyed sheet does not fall within a readable range of a neighboring split line sensor 80. The edge can be kept from stretching over the gap. Determination of a main-scanning-direction edge position of a sheet can be achieved only by checking image data B1 (image data B1 based on analog image signals A1) of one split line sensor 80. This results in smaller amount of data processing required for recognition of an actual edge position of the conveyed sheet. Thus, the processing of recognizing the actual edge position of a sheet can be simplified.

The image forming apparatus includes a control circuit (unit control circuit 9). The control circuit determines an actual edge position based on analog image signals A1 of individual pixels outputted by the line sensor 8. The actual edge position is a position of an actual edge of a conveyed sheet in the main scanning direction. A position of an edge (end) of the conveyed sheet in the main scanning direction can be determined.

The control circuit determines an actual edge position based on only image data B1 of a split line sensor 80 whose readable range overlaps with an ideal edge position of a conveyed sheet in the scanning direction, out of the plural split line sensors 80. Placement of gaps between one split line sensor 80 and another split line sensor 80 is devised. Therefore, even with a displacement of a conveyed sheet, the edge of the conveyed sheet does not fall within the readable range of a neighboring split line sensor 80. There is no need for checking the image data B1 of the plural split line sensors 80 to determine an actual edge position of a sheet. Also, data processing amount can be reduced.

One of the plural split line sensors 80 is placed at a position through which a center of the conveyed sheet passes (a position for reading a sheet center). The control circuit determines an actual edge position based on only image data B1 of one split line sensor 80 out of the split line sensors 80 placed outside the split line sensor 80 that reads the center of the conveyed sheet in the main scanning direction. This makes it possible to read the sheet center and moreover gives advantage for determination of a skew. It also becomes possible to determine an actual edge position based on image data B1 of a split line sensor 80 placed outside the sheet center.

The image forming apparatus includes a registrationless unit 7. The registrationless unit 7 is provided sheet-conveyance upstream of the image forming part 5c and sheet-conveyance downstream of the sheet reading unit 6. The registrationless unit 7 includes registrationless roller pairs 72, a registrationless motor 73, a casing 71, and a displacement compensation mechanism 7c. Each registrationless roller pair 72 feeds a conveyed sheet to the image forming part 5c without stopping the sheet. The registrationless motor 73 rotates the registrationless roller pairs 72. The casing 71 houses registrationless roller pairs 72. The displacement compensation mechanism 7c moves the casing 71 in the main scanning direction. The control circuit determines a displacement quantity of the conveyed sheet in the main scanning direction based on the actual edge position and an ideal edge position. During a period from when a conveyed sheet enters the registrationless roller pairs 72 until when the sheet passes therethrough, the control circuit instructs the displacement compensation mechanism 7c to move the casing 71 toward such a direction that the displacement in the main scanning direction is eliminated. A displacement quantity of the conveyed sheet in the main scanning direction can be determined. Further, the displacement in the main scanning direction can be compensated.

The control circuit instructs the displacement compensation mechanism 7c to move the casing 71 to an extent of distance equivalent to a determined main-scanning-direction displacement quantity. As a result of compensation, the main-scanning-direction displacement of the conveyed sheet can be eliminated. Image printing without any displacement can be fulfilled on the conveyed sheet.

An upper-limit value of moving distance of the casing 71 by the displacement compensation mechanism 7c is the permissible value. A sheet can be moved in the main scanning direction to a distance equivalent to the permissible value at a maximum. Even in irregular cases, moving distance of the casing 71 and the sheet can be suppressed to within the permissible value. By virtue of determination of the upper-limit value of moving distance, it becomes possible to go without increasing split line sensors 80 for checking the image data B1 (analog image signals A1) with consideration given to irregularities.

The casing 71 has a fulcrum shaft 76 provided on one end side in the main scanning direction. The registrationless unit 7 includes a skew correction mechanism 7b. The skew correction mechanism 7b makes the other end side of the casing 71 moved around the fulcrum shaft 76, causing the casing 71 to be rotated. Based on the analog image signals A1 outputted by the plural split line sensors 80, the control circuit determines a skew angle of a conveyed sheet. The control circuit instructs the skew correction mechanism 7b to rotationally move the casing 71 in response to the determined skew angle. It is implementable to determine a skew angle of the conveyed sheet and furthermore compensate the skew of the conveyed sheet without stopping the conveyed sheet.

Although an embodiment of this disclosure has been fully described hereinabove, yet the disclosure is not limited to the scope of this description and may be modified in various ways unless those modifications depart from the gist of the invention.

For example, an example in which the line sensor 8 includes three split line sensors 80 has been described above. However, the splitting number may also be two or four or more. In this case also, the split line sensors 80 are so disposed that a distance from a gap between one split line sensor 80 and another split line sensor 80 to an ideal edge position exceeds the permissible value.

According to this disclosure, with use of line sensors split into a plurality of blocks, data processing amount can be reduced. Processing involved can be simplified.

This disclosure is applicable to image forming apparatuses including a sheet reading unit for reading a conveyed sheet.

What is claimed is:

1. An image forming apparatus comprising:
a sheet conveyance part for conveying a sheet;
an image forming part for forming an image on a conveyed sheet; and
a sheet reading unit including
a lamp for throwing light to the conveyed sheet and a line sensor for reading the conveyed sheet, wherein
the sheet reading unit is provided sheet-conveyance upstream of the image forming part,
the line sensor includes a plurality of split line sensors,
the split line sensors are arrayed in a row, and
light-receiving elements of each of the split line sensors are arrayed along a main scanning direction,
the split line sensors are placed at non-stretching positions, respectively,
each of the non-stretching positions is such a position that a distance in the main scanning direction from a gap between one and another of the split line sensors to an ideal edge position of every usable regular size exceeds a permissible value,
the ideal edge position is a position of an edge of the conveyed sheet with no displacement in the main scanning direction, and
the permissible value is a predetermined value.

2. The image forming apparatus according to claim 1, further comprising
a control circuit for determining an actual edge position based on pixel-base analog image signals outputted by the line sensors, wherein
the actual edge position is a position of an actual edge of the conveyed sheet in the main scanning direction.

3. The image forming apparatus according to claim 2, wherein
the control circuit determines the actual edge position based on only image data of a split line sensor whose readable range overlaps with the ideal edge position of the conveyed sheet in the main scanning direction out of the plural split line sensors.

4. The image forming apparatus according to claim 3, wherein
one of the plural split line sensors is placed at a position through which a center of the conveyed sheet passes, and
the control circuit determines the actual edge position based on only image data of one split line sensor out of the split line sensors placed outside the split line sensor that reads a center of the conveyed sheet in the main scanning direction.

5. The image forming apparatus according to claim 2, further comprising a registrationless unit provided sheet-conveyance upstream of the image forming part and sheet-conveyance downstream of the sheet reading unit, wherein the registrationless unit includes:
- a registrationless roller pair for feeding the conveyed sheet to the image forming part without stopping the sheet;
- a registrationless motor for rotating the registrationless roller pair;
- a casing for housing the registrationless roller pair; and
- a displacement compensation mechanism for moving the casing in the main scanning direction, and the control circuit:
- determines a displacement quantity in the main scanning direction of the conveyed sheet based on the actual edge position and the ideal edge position, and
- during a period from when the conveyed sheet enters the registrationless roller pair until when the conveyed sheet passes therethrough, instructs the displacement compensation mechanism to move the casing in such a direction that any displacement in the main scanning direction is eliminated.

6. The image forming apparatus according to claim 5, wherein the control circuit instructs the displacement compensation mechanism to move the casing to an extent of distance equivalent to the determined displacement in the main scanning direction.

7. The image forming apparatus according to claim 5, wherein an upper-limit value of moving distance of the casing by the displacement compensation mechanism is the permissible value.

8. The image forming apparatus according to claim 5, wherein the casing has a fulcrum shaft provided on one end side of the main scanning direction, the registrationless unit includes a skew correction mechanism for moving the other side of the casing around the fulcrum shaft so that the casing is rotated, and the control circuit
- determines a skew angle of the conveyed sheet based on the analog image signals outputted by the plural split line sensors, and
- instructs the skew correction mechanism to rotationally move the casing in response to the determined skew angle.

* * * * *